US008939668B2

(12) United States Patent
Waddell

(10) Patent No.: US 8,939,668 B2
(45) Date of Patent: Jan. 27, 2015

(54) TIRE PROTECTANT APPLICATOR SYSTEM

(71) Applicant: Rick L. Waddell, Cedar Rapids, IA (US)

(72) Inventor: Rick L. Waddell, Cedar Rapids, IA (US)

( * ) Notice: Subject to any disclaimer, the term of this patent is extended or adjusted under 35 U.S.C. 154(b) by 0 days.

(21) Appl. No.: 14/157,209

(22) Filed: Jan. 16, 2014

(65) Prior Publication Data
US 2014/0199110 A1    Jul. 17, 2014

Related U.S. Application Data

(60) Provisional application No. 61/753,632, filed on Jan. 17, 2013, provisional application No. 61/767,107, filed on Feb. 20, 2013, provisional application No. 61/819,300, filed on May 3, 2013.

(51) Int. Cl.
*B05B 15/04* (2006.01)
*B60C 13/00* (2006.01)

(52) U.S. Cl.
CPC ............... *B60C 13/002* (2013.01); *B05B 15/04* (2013.01)
USPC ............................... 401/139; 401/14; 401/190

(58) Field of Classification Search
CPC ..................... B05B 15/0437; A46B 11/0017
USPC ..................... 401/14, 137, 139, 190
See application file for complete search history.

(56) References Cited

U.S. PATENT DOCUMENTS

| 2,567,764 | A | * | 9/1951 | Davies | 401/22 |
| 3,184,781 | A | * | 5/1965 | Hoxie | 401/22 |
| 3,256,549 | A | * | 6/1966 | Evesque | 401/190 |
| 5,169,252 | A | * | 12/1992 | Chappell | 401/46 |
| 5,577,851 | A | * | 11/1996 | Koptis | 401/202 |
| 6,048,583 | A | * | 4/2000 | Waddell | 427/429 |
| 6,945,722 | B2 | * | 9/2005 | Colburn et al. | 401/11 |
| 7,275,884 | B2 | * | 10/2007 | Sassouni | 401/202 |
| 2004/0228672 | A1 | * | 11/2004 | Colburn et al. | 401/205 |
| 2008/0083368 | A1 | * | 4/2008 | Ward | 118/264 |
| 2012/0096662 | A1 | * | 4/2012 | Uchiyama et al. | 15/160 |

* cited by examiner

*Primary Examiner* — David Walczak
*Assistant Examiner* — Joshua Wiljanen
(74) *Attorney, Agent, or Firm* — Simmons Perrine Moyer Bergman PLC

(57) ABSTRACT

A system for applying chemical liquid protectant to tires which has an applicator with a foam pad for mating with the tire and a foam support structure for mating with the foam pad, where the foam pad has a quick connection to a source of pressurized chemical liquid protectant; the system having a nozzle for dispensing chemical liquid protectant into an area central to the foam pad.

5 Claims, 8 Drawing Sheets

TIRE PROTECTANT APPLICATOR SYSTEM

FIELD OF THE INVENTION

The present invention relates to methods and systems for applying chemical liquid protectant or dressing to tires.

BACKGROUND OF THE INVENTION

In the past, chemical liquid protectants, such as ArmorAll, have been sprayed by consumers from a hand operated squeezing pump container. Professionals have used brush devices with pressurized delivery of liquid protectant, such as the Swabby sold by Sunshine Sales, Inc. of Cedar Rapids, Iowa and described in U.S. Pat. No. 6,048,583 for commercial uses, especially with automotive tires. While these techniques have provided much utility in the past, they do have some drawbacks.

First of all, the chemical liquid protectant product is expensive and is typically sprayed on the tire (with the consumer device) and is susceptible to being blown by wind or accidentally sprayed in an unintended direction. This results in wasted liquid protectant and in a need to clean up after the job is completed. Additionally, the use of a separate rag, sponge or wiping pad etc. to spread the sprayed liquid protectant either takes two hands or requires one to switch back and forth with one hand thereby increasing inefficiencies. Often chemical liquid protectants are done in conjunction with a car wash. In such cases, the tires are often washed and are wet. Applying chemical liquid protectants to the tires when they are wet results in dilution of chemical liquid protectants and possibly running and dripping of the chemical liquid protectants when it combines with the water on the tire. It is often necessary to first wipe the excess water from the tire before applying any chemical liquid protectants. This is time consuming.

Consequently, there is a need for improved devices which reduce waste of chemical liquid protectants, reduces time required for application and reduces clean up times.

BRIEF DESCRIPTION OF THE DRAWINGS

In the following description of the drawings, like reference numerals are employed to indicate like parts, in the various views.

DETAILED DESCRIPTION OF THE DRAWINGS

Figure 1:
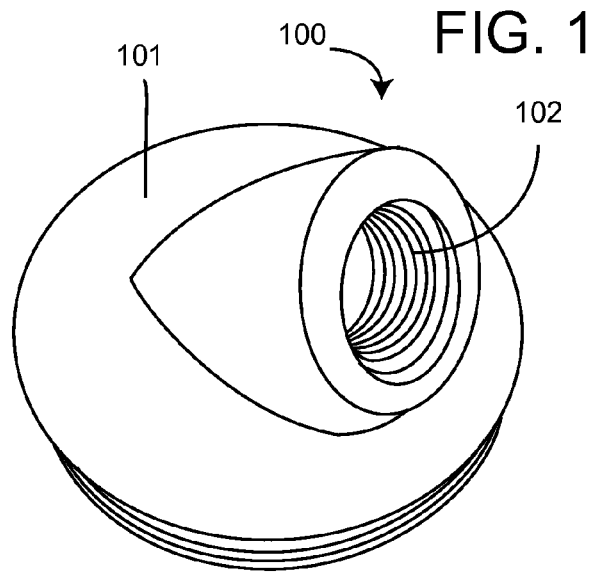
FIG. 1 is a perspective view of the rigid-interface block of the present invention.

In the following description of the drawings, like reference numerals are employed to indicate like matter, in the various views. Please note that in the discussion below, an example of applying a liquid chemical surface treatment, such as ArmorAll protectant, to tires is used. It should be understood that other liquids, and objects other than tires, could be applicable to the present invention.

FIG. 1 is a perspective view of an adapter, generally designated 100 of the present invention, which includes the rigid-interface block 101, which shows a rigid-interface block-threaded chemical flow receiving orifice 102, which is adapted to receive therein a handle, canister or other liquid supplying structure, such as a hose. Rigid-interface block-threaded chemical flow-receiving orifice 102 may be made of plastic or other suitable material. Rigid-interface block 101 is shown as being circular in cross-section, which is preferable when the pad which it supports is also circular in cross-section. Other shapes, such as rectangular, could be desirable in some applications. Rigid-interface block-threaded chemical flow-receiving orifice 102 is shown angled with respect to the main portion of rigid-interface block 101. This may be preferred for hand-held devices, where the angle could be more comfortable to the user. Rigid-interface block 101 is shown having a rigid-interface block outflow orifice 402 (FIG. 4). A passage for conveying liquid exists within the rigid-interface block 101, between rigid-interface block-threaded chemical flow-receiving orifice 102 and rigid-interface block outflow orifice 402. Rigid-interface block outflow orifice 402 is preferably threaded so as to receive therein threaded objects, such as a nozzle, to rigid-interface block outflow orifice mating threads 304 (FIG. 3).

Figure 2:
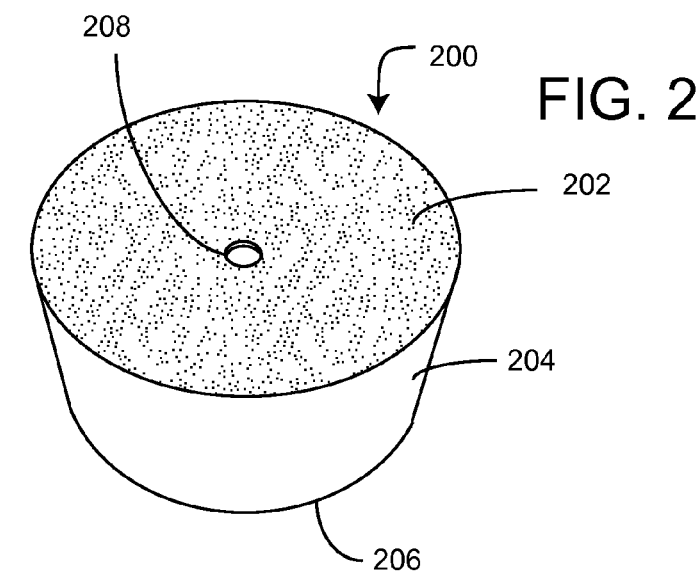
FIG. 2 is a perspective view of foam chemical application pad assembly of the present invention.

Now referring to FIG. 2, there is shown a foam chemical application pad assembly generally designated 200, of the present invention, which includes a foam chemical application pad 202, which may be made of any suitable foam material which are used for applying a liquid through a foam applicator pad. When the system is used to apply a shine or dressing to tires, a foam, which is similar to the TS100, TS200, TS400 or TS500 foam pads, which are commercially available from Simoniz Company at www.simonizusa.com, may be preferred. Foam chemical application pad assembly 200 is shown with a water-resistant coating 204 thereon. This coating may be a chemical treatment applied to the exterior of the pad to form a barrier, which remains flexible, but tends to repel water. Kilz original stainblocking primer may be applied to the exterior surface of the foam chemical application pad 202 and create a flexible barrier. Other water-repelling sealers, coatings such as silicone, paint, latex or other similar materials could be used as well. Additionally, it is contemplated that the water-resistant coating 204 could be a plastic-film shrink wrapped around the foam chemical application pad 202, or numerous other water-repelling flexible barriers could be substituted as well. The purpose of water-resistant coating 204 is to allow the foam chemical application pad assembly 200 to have a "squeegee" function. For example, if an automobile has been recently washed, and the tires are wet and a chemical tire shining dressing is to be applied to the tires, it may be desired to remove some of the excess water from the tire to improve the efficacy of the applied chemical tire shining dressing. When the system of the present invention is used on wet tires, and it is pressed against a wet tire and moved across the surface of the sidewall of the wet tire, the water-resistant coating 204 contacts the water on the surface of the sidewall and, because it is not highly absorptive (like the untreated or coated foam chemical application pad 202), it tends to repel the water and push or pull the water, much like a squeegee. The addition of the water-resistant coating 204 dramatically increases the utility of the system of the present invention over a mere uncoated or untreated foam chemical application pad 202. Foam chemical application pad 202 is mounted to a foam pad rigid backing disk 206, with a disk central hole 602 (FIG. 6) therein. Foam pad rigid backing disk 206 creates a structure, which can be held firmly against the rigid-interface block 101 by chemical spraying nozzle 300 (FIG. 3). Foam pad rigid-backing disk 206 may be only semi-rigid in some applications. The material for foam pad rigid-backing disk 206 may be the same as rigid-interface block 101, or other suitable materials which are less rigid, or otherwise tailored for a particular application. Foam chemical application pad 202 is shown with a foam chemical application pad central spray and nozzle access hole 208 therethrough. Foam chemical application pad central spray and nozzle access hole 208 provides the ability for a tool to be inserted through the foam chemical application pad 202, and engage the nozzle wrench mating section 306 (FIG. 3). It also provides a port through which the liquid can be sprayed from the nozzle 300 unto the tire. As the foam chemical application pad 202 is worn by use, the nozzle wrench mating section 306 can be loosened, the foam pad rigid backing disk 206 rotated slightly, so that the worn area is located in a position where wear occurs at a slower rate, and the nozzle wrench mating section 306 is tightened back up before continuing use.

Figure 3:
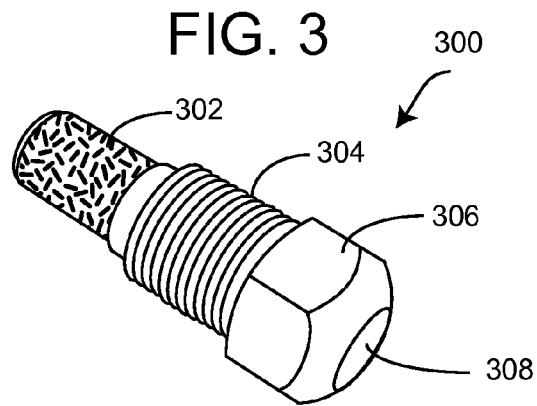
FIG. 3 is a perspective view of a chemical spraying nozzle of the present invention.
Figure 4:
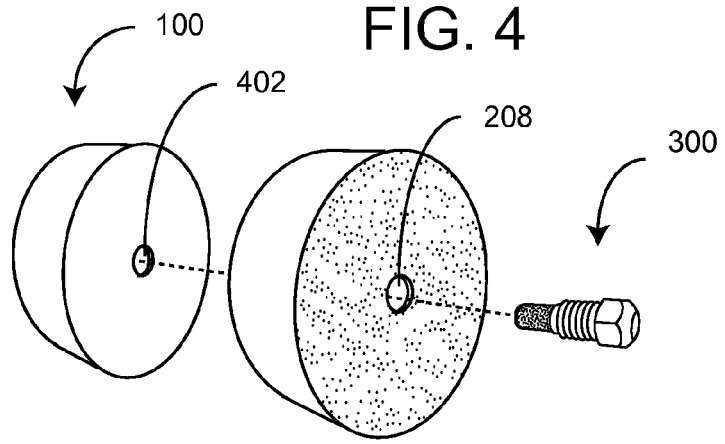
FIG. 4 is a perspective exploded view of the chemical application system of the present invention.

Now referring to FIG. 3, there is shown the chemical spraying nozzle 300 of the present invention, which includes integrated cleanable filter 302, nozzle to rigid-interface block outflow orifice mating threads 304, nozzle wrench mating section 306 and nozzle chemical spraying outlet 308. Chemical spraying nozzle 300 may include an internal check valve, as well, to reduce leaking from the nozzle when not in use. Chemical spraying nozzle 300 is commercially available, and variations of it could be utilized as well.

Now referring to FIG. 4, there is shown an exploded view of the system of the present invention. The chemical spraying nozzle 300 can be inserted through the foam chemical application pad central spray and nozzle access hole 208 in foam chemical application pad 202, and into the rigid-interface block 101 and nozzle to rigid-interface block outflow orifice mating threads 304 mate with threads in rigid-interface block outflow orifice 402. When nozzle wrench mating section 306 is turned, foam pad rigid-backing disk 206 is held firmly against rigid-interface block 101, yet foam chemical application pad 202 is easily replaced when needed. Rigid-interface block outflow orifice 402 is shown as a single orifice, but in some applications it may be desirable to have many orifices, which allow liquid to be applied at several locations to the backside of foam chemical application pad 202.

Figure 5:
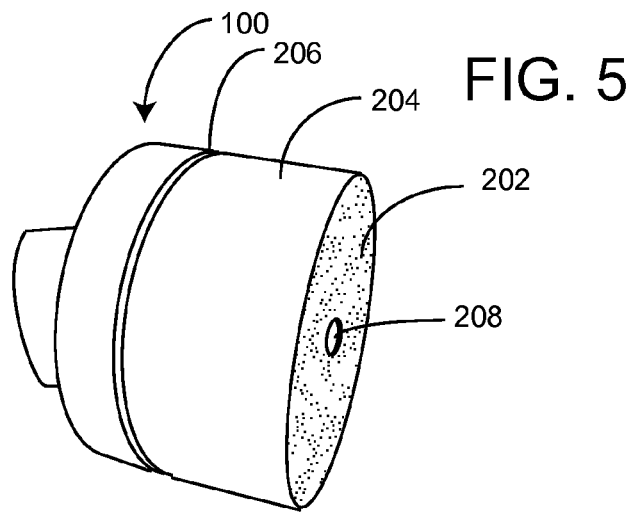
FIG. 5 is a perspective assembled view of the chemical application system of the present invention.

Now referring to FIG. 5, there is shown an assembled view of the present invention.

Figure 6:
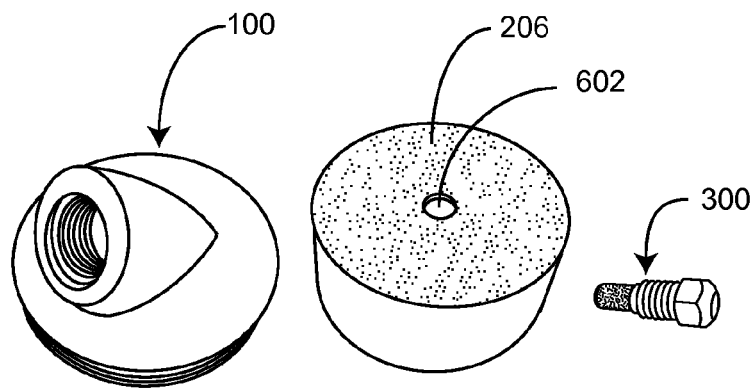
FIG. 6 is a perspective view of the unassembled parts of the present invention.

Now referring to FIG. 6, there is shown a disassembled view of the parts of the present invention. In FIG. 6, disk central hole 602 is visible.

In operation, the present invention could be utilized as follows:

The system is assembled as shown in FIG. 5. The system is coupled to a pressurized source of liquid, such as described in U.S. Pat. No. 6,048,583, entitled Method of Applying a Liquid Protectant, which patent is hereby incorporated herein in its entirety by this reference. The mechanism described in this patent, without the inclusion of the end brush attachment, shall be considered a means for delivering chemical liquid protectant under pressure to an applicator. The device of the present invention is placed against a wet tire, it is moved across the surface of the wet tire, the water-resistant coating 204 acts as a squeegee and pushes water away from the surface where the protectant is to be applied, through the chemical spraying nozzle 300 and smoothed out by the foam chemical application pad 202. This is all done with one motion of the operator's hand, reducing the need for multiple steps of wiping water off the tire and then applying protectant to the tire.

Figure 7:
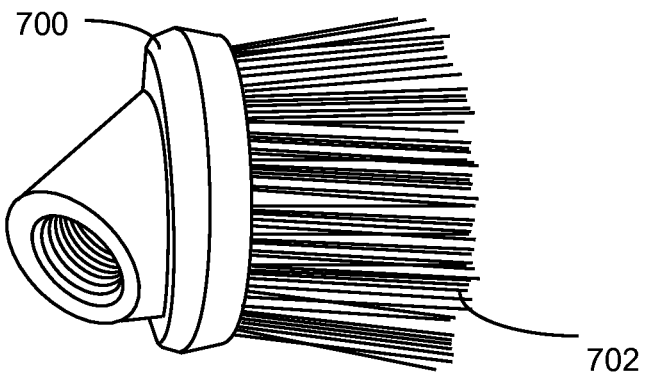
FIG. 7 is a side perspective view of a brush surround of the present invention.

Now referring to FIG. 7, there is shown a brush surround 702 which is designed to assist in the removal of residual water that is left on tires after being washed. It also serves as a flexible material that can reach the difficult area located at the bottom of the tire, where the tire sits on the ground. The weight of the vehicle can cause the tire to have a different contour than the other area of the tire. Brush surround 702 is attached to plastic block 700 through which the chemical product flows from either a handle attached to it or through a canister directly mounted to the block.

Figure 8:
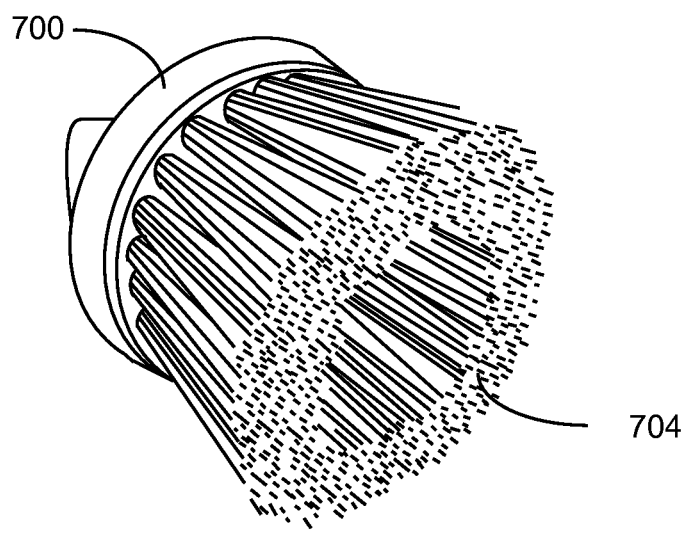
FIG. 8 is a bottom perspective view of the brush surround of FIG. 7.

Now referring to FIG. 8, there is shown a brush surround 702 with an opening 704 in the face of the brush surround 702 to allow for the insertion of a conical foam pad insert.

Figure 9:
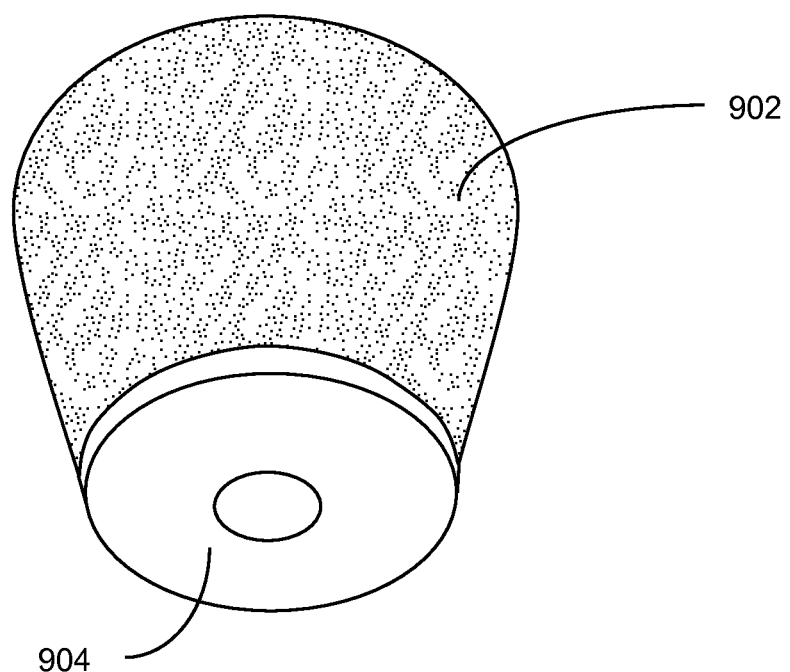
FIG. 9 is a perspective view of the foam insert of the present invention.

Now referring to FIG. 9, there is shown a foam pad 902 that has a rigid plastic backing 904 applied to give strength to the foam where it attaches to block 700 and also serves as the mounting plate through which the nozzle (FIG. 10) is inserted and is threaded into the block 700.

Figure 10:
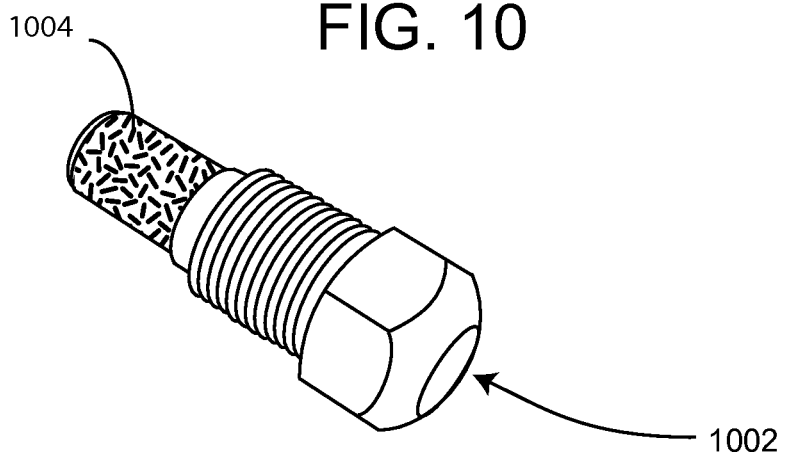
FIG. 10 is a perspective view of the nozzle, filter and check valve of the present invention.

Now referring to FIG. 10, there is shown a nozzle 1002 with an integrated filter 1004, which may be a screen, and check valve that helps eliminate chemical leaking from nozzle when not in use. Nozzles such as these are commercially available.

Figure 11:
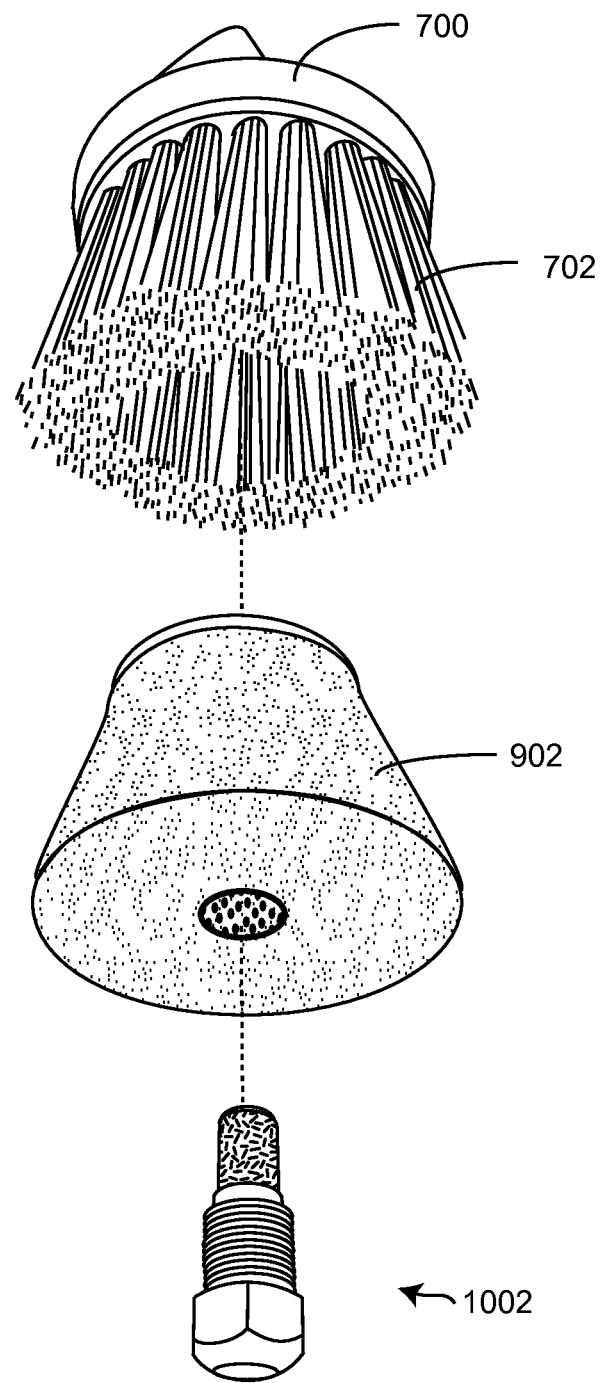
FIG. 11 is an exploded view of the items shown in FIGS. 8-10.

Now referring to FIG. 11, there is shown an exploded view of the parts shown in FIGS. 8-10 and also shown is Foam pad 902 is held in place by the nozzle 1002.

The foam pad 902 is sized so as to be able to be forced in the brush surround 702. This provides for a firm and dense compaction of the brush material located around the perimeter.

Now referring to FIGS. 7-11, this block 700 has a perimeter of brush fibers filled into it. The fill material consists of two rows of material around the outer edge, leaving a void 704 in the center to allow for the insertion of a conical shaped foam pad 902. The brush surround 702 should be a wear resistant and chemically resistant material allowing it to be used with both solvent-based and water-based tire dressing products known to exist in the car care marketplace. By having the brush surround 702 extend ⅛ inch or slightly taller than the foam insert 902, it allows the brush surround 702 to contact the water first and act as a shield for the foam pad 902, which will apply and smooth the tire dressing product onto the tire surface. This also assists in helping to reduce chemical costs, waste and by not having excess chemical drips onto the floor area, resulting in a safer working environment, in addition to a safer environment for the customers who traverse over these areas to retrieve their vehicles after they have been washed in a full service car wash. The brush/foam pad is adaptable to other industries or other uses.

This design also works well on a dry tire or semi-dry tire, with the added benefit of reducing costs of chemical. When chemicals are dispensed through the center of the foam pad 902, significant benefits are gained over other methods. The brush/foam pad is pressed against the tire to trap the chemical being dispensed through the nozzle 1002 in the center of the foam pad 902. This prevents chemical from going anywhere other than where it was intended.

In the instance of aerosol products that are sprayed onto the surface of a tire, we find that a sizable portion of chemical drifts onto the ground, or onto the car body surface area.

When chemicals are applied by a sponge, trigger sprayers or aerosol device, the person applying it is usually coming into direct contact with these products, unless they are wearing protective equipment.

While the foam-only pad alone works well in many situations, it can have difficulty in dealing with residual water left on the tire after a car wash. Even with applying a coating to the perimeter of a foam pad, the pad can become overly saturated and, when depressed on the tire, it releases too much entrapped chemical and water when attempting to finish the area at the bottom of the tire, where it contacts the ground. These foam-only pad designs are well suited to a dry tire or semi-dry tire situation.

A coating could be (but is not required to be) added to the foam pad 902 (such as Hypalon (available from DuPont) or equivalent) that is water and chemical resistant to the interior of the small hole (approx. ⅝ diameter), and the same coating could be applied to the outside conical surface area. This will provide a passage way for chemical that is dispersed from the nozzle to travel and not be absorbed into the interior side wall of the ⅝ opening in the foam. The coating on the exterior of the conical area will also prevent any chemical from leaking through the exterior surface area of the conical shape. This should limit the surface area that is applying chemical to just the face of the foam pad 902 inserted into the brush surround 702.

Figure 12:
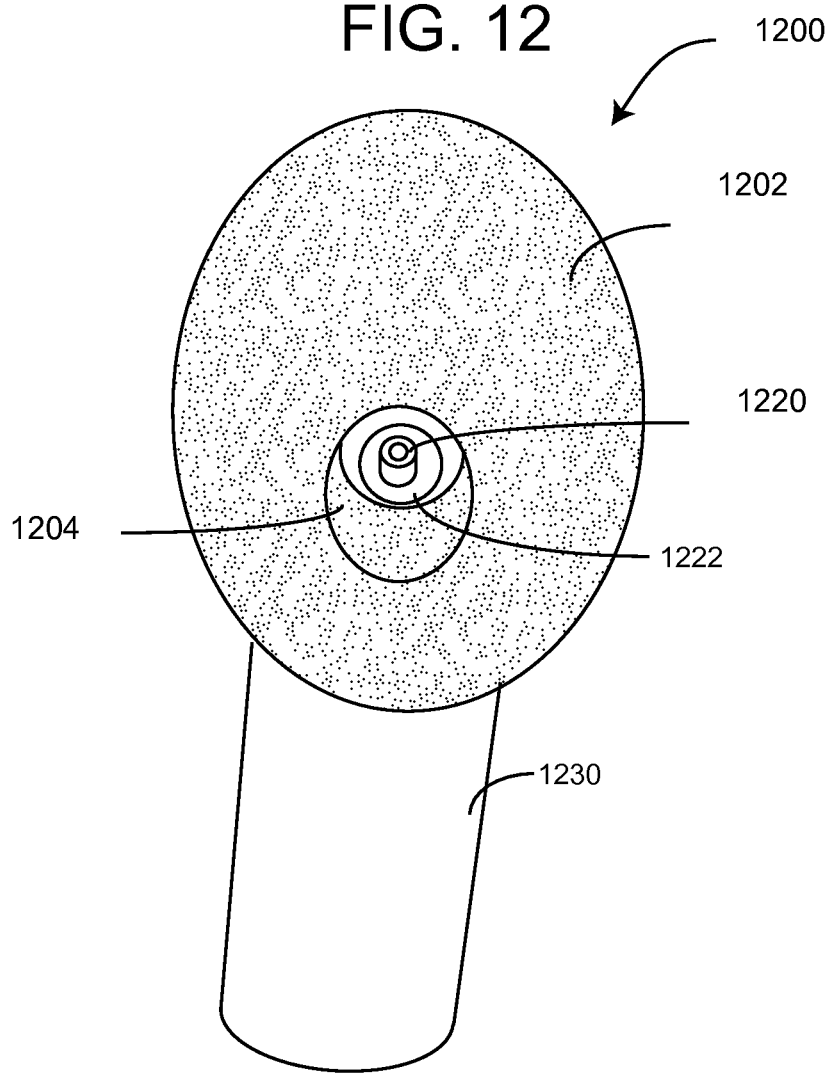
FIG. 12 is a perspective view of an alternate embodiment of the present invention with a foam pad and an aerosol can.

Now referring to FIG. 12, there is shown a face of the foam pad 1202 (now this could be a foam pad similar to 902 with a brush around it). The open area 1204 is the opening by which the tire dressing product is dispensed through orifice 1220 in attachment nozzle end 1222 and it passes through this opening to contact the face of the tire. The product is then spread around the surface of the tire providing an even and encapsulated way of delivering product to the tire surface. This design prohibits air currents from disrupting the spray coming from the nozzle, thereby keeping the unintended target areas from being soiled by the tire dressing product. This also keeps the pavement clean. This further helps to prevent accidents by eliminating a slippery condition on the ground. The aerosol can 1230 is also shown.

Figure 13:
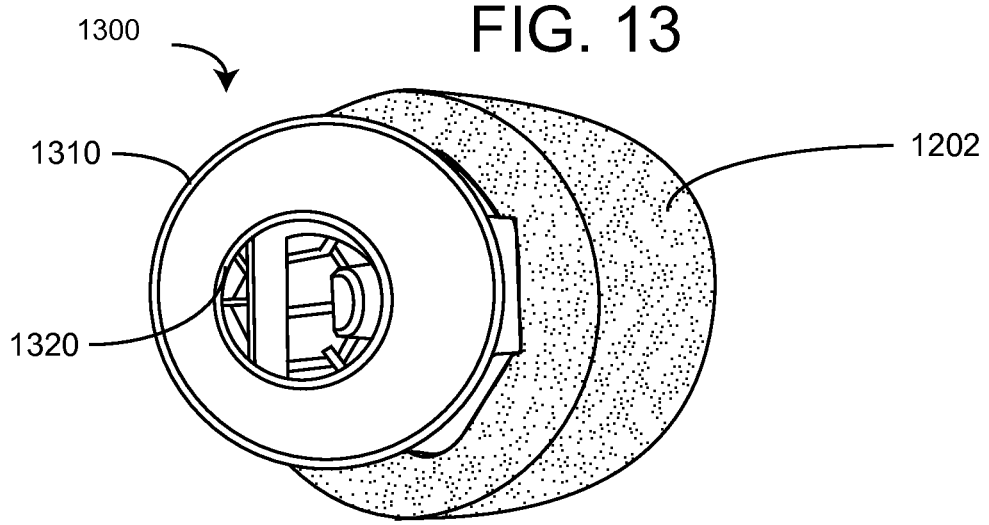
FIG. 13 is a bottom perspective view of a portion of the foam pad attachment portion of the present invention.

Now referring to FIG. 13, there is shown foam pad attachment 1300 with end 1310 with a can nozzle receiving hole 1320.

Figure 14:
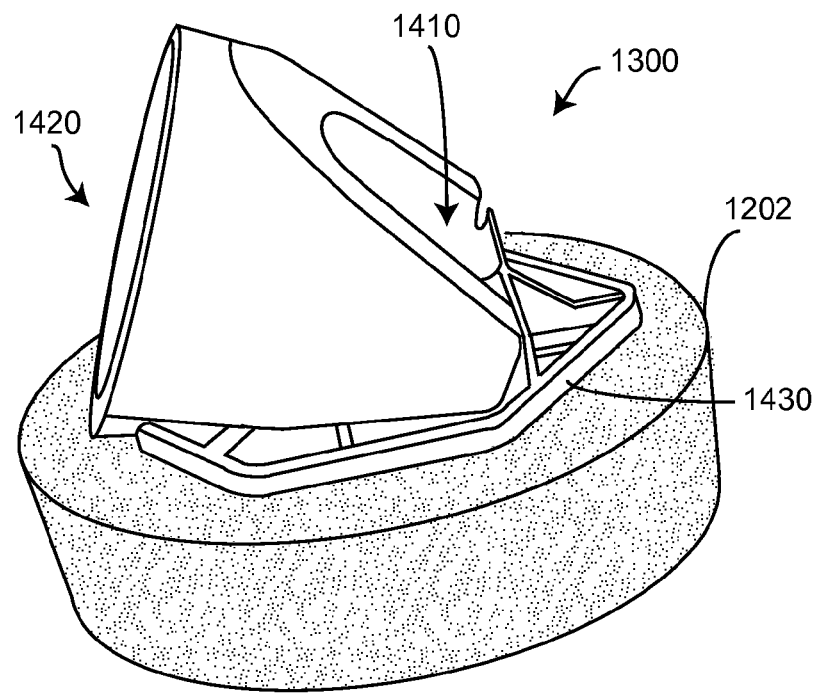
FIG. 14 is a side view of the foam pad attachment portion shown in FIG. 13.

Now referring to FIG. 14, there is shown a side view of the foam pad attachment 1300 of FIG. 13, which shows a finger receiving spray actuating hole 1410 and an open can receiving end 1420. Also shown is a plastic foam mating structure 1430.

Figure 15:
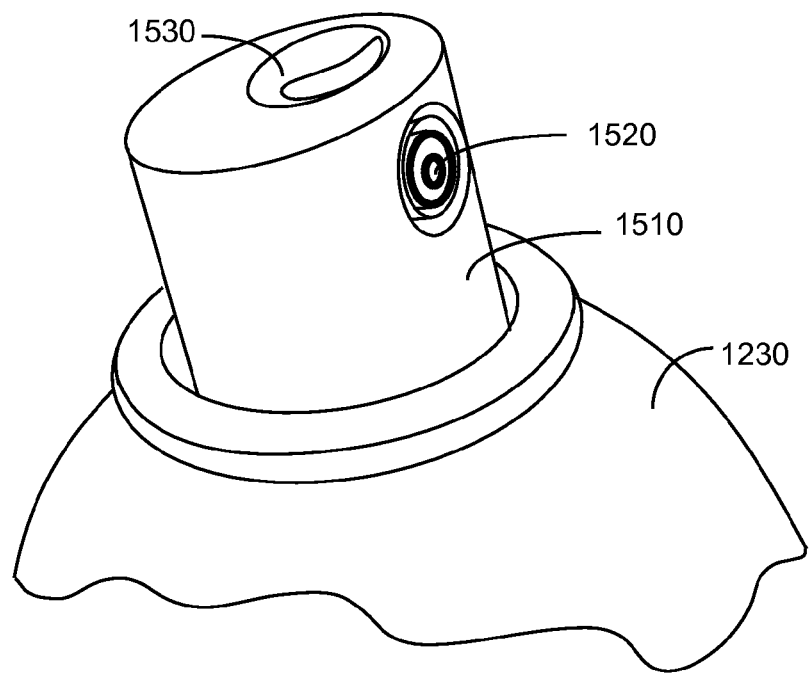
FIG. 15 is perspective view of the aerosol can and spray nozzle of the present invention.

Now referring to FIG. 15, there is shown a spray can head 1510, with a spray can head orifice 1520 and a spray can head finger engaging portion 1530.

Figure 16:
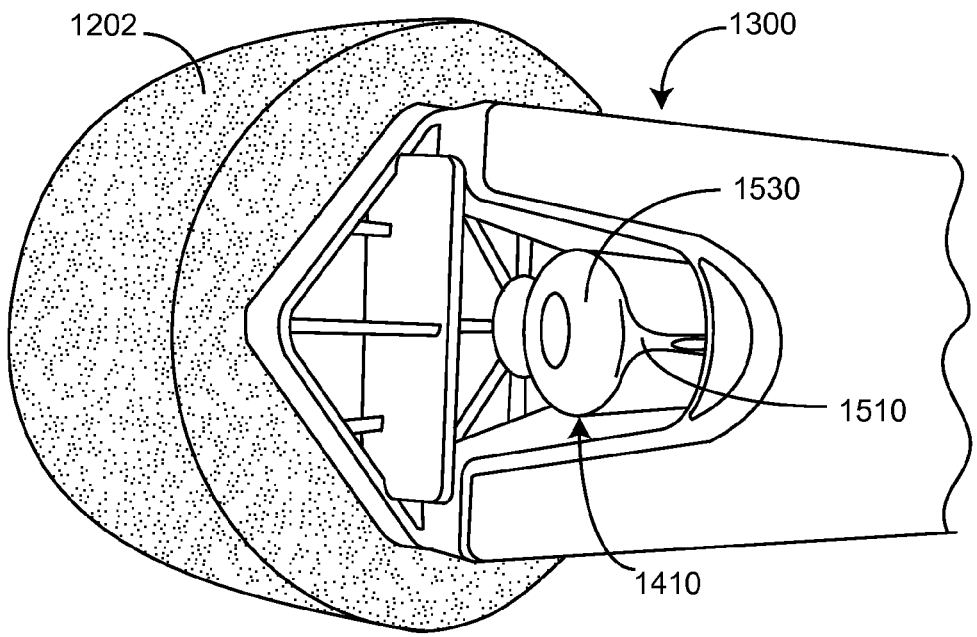
FIG. 16 is perspective view of the foam pad attachment of FIGS. 13 and 14 disposed atop the aerosol can and spray nozzle of FIG. 15.

Now referring to FIG. 16, there is shown an assembled view of the spray can 1230, the spray can head 1510 inside the attachment 1300 so that a finger can enter hole 1410 and actuate the spray can head 1510.

Figure 17:
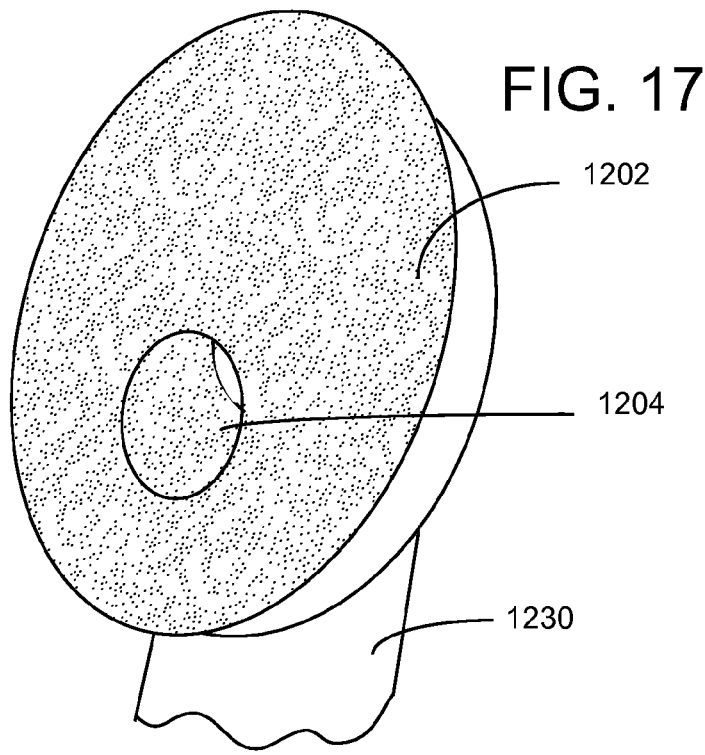
FIG. 17 is a perspective view of the present invention which shows the face of the foam pad.

Now referring to FIG. 17, there is shown another view of the foam pad attachment 1300 atop the can 1230.

It is thought that the method and apparatus of the present invention will be understood from the foregoing description, and that it will be apparent that various changes may be made in the form, construct steps, and arrangement of the parts and steps thereof, without departing from the spirit and scope of the invention, or sacrificing all of their material advantages. The form herein described is merely a preferred exemplary embodiment thereof.

I claim:

1. A system for applying a protectant to a tire comprising:
    a means for delivering chemical liquid protectant under pressure to an applicator; and
    an applicator configured to receive chemical liquid protectant under pressure, said applicator comprising:
        a foam member having a face side configured to engage with a surface to be treated with chemical liquid protectant and an opposing support side;
        a foam member support structure configured to couple with and provide support to said support side;
        said foam member support structure further configured to permit chemical liquid protectant to pass therethrough and into an area at least partially surrounded by portions of said foam member;
        a peripheral structure disposed about said foam member;
        wherein said area in said foam member is a void therethrough extending from said support side to said face side and configured to allow chemical liquid protectant to be sprayed therethrough; and
        wherein said peripheral structure is a brush with a void therein for retaining said foam member.

2. The system of claim 1 wherein said foam member support structure has an orifice therethrough for cooperating with said means for delivering chemical liquid protectant under pressure to an applicator and further comprising a nozzle configured to spray chemical liquid protectant and to hold said foam member support structure with respect to a portion of said applicator.

3. A system for applying a protectant to a tire comprising:
    a means for delivering chemical liquid protectant under pressure to an applicator; and
    an applicator configured to receive chemical liquid protectant under pressure, said applicator comprising:
        a foam member having a face side configured to engage with a surface to be treated with chemical liquid protectant and an opposing support side;
        a foam member support structure configured to couple with and provide support to said support side; and
        said foam member support structure further configured to permit chemical liquid protectant to pass therethrough and into an area at least partially surrounded by portions of said foam member;
        wherein said foam member support structure has an orifice therethrough for delivering chemical liquid protectant under pressure; and
        a nozzle configured to spray chemical liquid protectant and to hold said foam member support structure with respect to a portion of said applicator.

4. A system for applying a liquid chemical protectant to a tire, the system comprising:
    a member configured to allow chemical product to flow therethrough;

a brush surround supported by said member and configured to assist in the removal of residual water that is left on a tire after being washed;
said brush surround having a member end and a face end and further having an opening in said face end;
a foam pad assembly comprising a rigid backing and a foam pad member;
said foam pad assembly configured to be inserted through said opening in said face end so that said rigid backing contacts said member;
a nozzle assembly comprising:
   an integrated screen filter;
   a check valve; and
   a nozzle configured to spray out liquid;
said nozzle assembly further comprising threads thereon configured to mate with structure on said member and retain said foam pad assembly in contact with said member; and,
said foam pad assembly being sized and conically shaped to be inserted through said opening so that a terminal portion of said foam pad member is recessed and inside from said face end.

5. The system of claim 4 wherein said foam pad member is further sized and configured so as to be able to be forced in the brush surround so as to provide for a firm and dense compaction of the brush surround.

\* \* \* \* \*